United States Patent [19]

Hannett

[11] Patent Number: 4,502,084
[45] Date of Patent: Feb. 26, 1985

[54] AIR CONDITIONING SYSTEM TROUBLE REPORTER

[75] Inventor: William J. Hannett, Jamesville, N.Y.
[73] Assignee: Carrier Corporation, Syracuse, N.Y.
[21] Appl. No.: 497,460
[22] Filed: May 23, 1983
[51] Int. Cl.³ .............................................. H02H 3/04
[52] U.S. Cl. ................................ 361/23; 340/815.23; 340/521; 361/22; 361/170
[58] Field of Search .................... 361/22, 23, 114, 170, 361/189; 340/521, 585, 815.23, 635, 679

[56] References Cited

U.S. PATENT DOCUMENTS

| | | | |
|---|---|---|---|
| 2,934,752 | 4/1960 | Arrasmith | 340/521 X |
| 3,011,162 | 11/1961 | Byrnes | 361/189 X |
| 3,094,646 | 6/1963 | Swelt | 361/23 |
| 3,563,048 | 2/1971 | Barry | 361/22 X |
| 3,700,964 | 10/1972 | Moore | 361/32 |
| 4,176,350 | 11/1979 | Patterson | 361/23 X |

OTHER PUBLICATIONS

Technical Data Form 19-44-B, Detroit 400-Controls, Detroit Switch, Inc.

Primary Examiner—Harry E. Moose, Jr.
Attorney, Agent, or Firm—David J. Zobkiw

[57] ABSTRACT

The occurrence of a condition indicative of an impending shutdown causes the closing of a switch which completes a circuit powering an indicator and a relay coil. The powering of the relay coil causes the closing of the associated contacts which completes a circuit for powering the relay coil independent of the initial closing of the switch so that the indicator remains powered/lit until manually disabled. The powering of the coil also results in the establishing of a summary fault signal. A timing relay is used to avoid false signals at start up.

3 Claims, 1 Drawing Figure

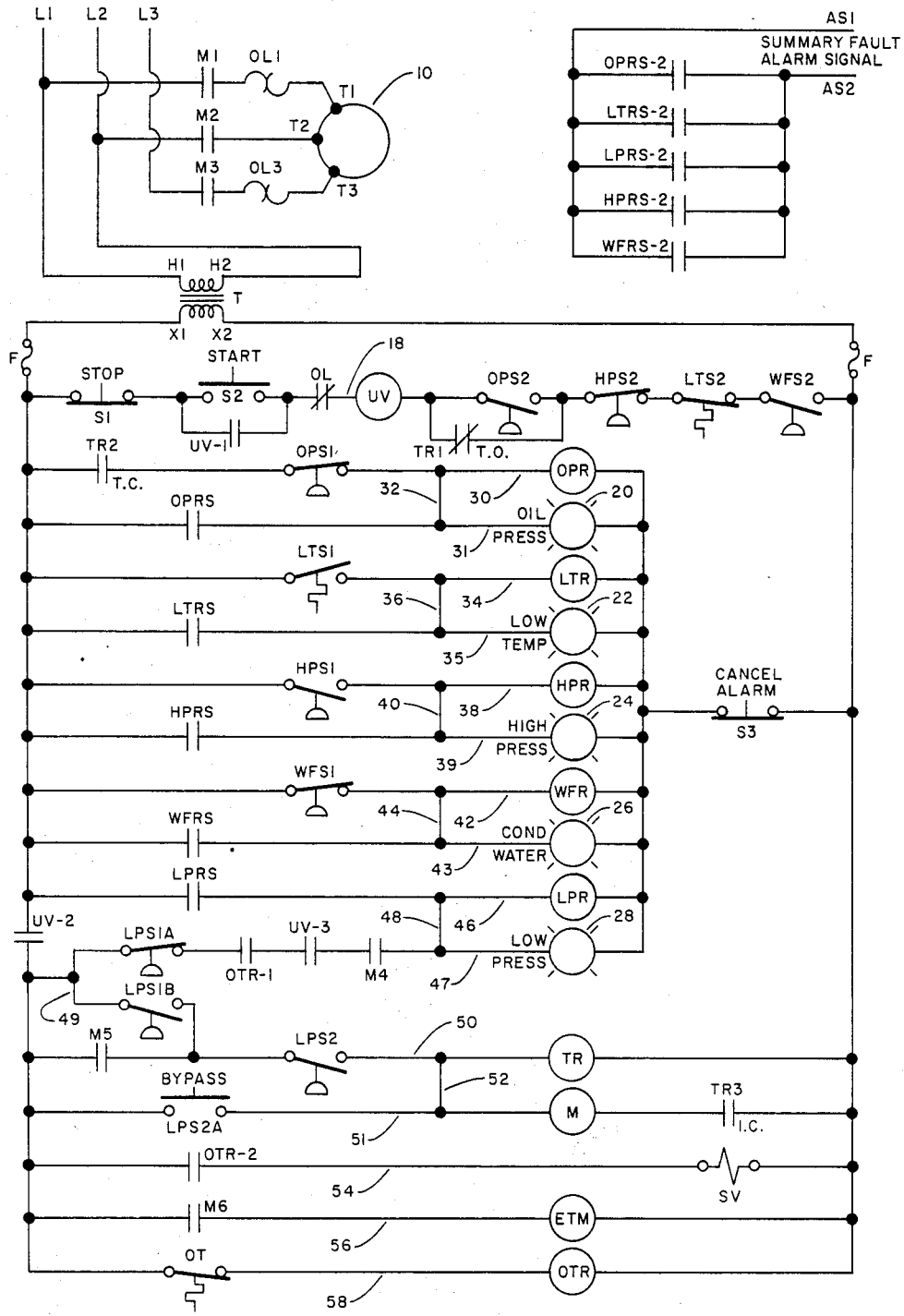

AIR CONDITIONING SYSTEM TROUBLE REPORTER

BACKGROUND OF THE INVENTION

An air conditioning or refrigeration plant can be shut down in response to the sensing of any one of a number of abnormal conditions. While the sensed abnormal condition causing shutdown may be precipitous, it is ordinarily developed over a period of time during which the system condition is in the abnormal range but has not reached a level requiring the system to shut down. It is, therefore, a general practice in some installations, as aboard ship, to monitor the gages, sensors, etc. on a round-the-clock basis. When the system is automatically shut down, the sensed abnormal condition is often removed or is subject to dissipation as in the case of a temperature condition. If the gages and sensors have not been monitored closely or if the condition is precipitous, the condition causing the system to shut down may not be readily known. As a result, correcting the problem may first involve determining the problem which, at times, can be a problem itself.

SUMMARY OF THE INVENTION

Sensed abnormal conditions in an air conditioning or refrigeration system which have not reached a level requiring shutdown cause the actuation of a warning signal and, if necessary, the shut down signal. The warning and shut down signals are supplied by dual actuators which actuate two switches. The first switch is actuated responsive to a first temperature or pressure condition indicative of a potential shut down. The second switch is actuated at a second temperature or pressure causing the system to shut down in order to protect the equipment. The actuation of the first switch to cause the actuation of the warning device will keep the warning device actuated until manually disabled. It is possible for a number of warning devices to be actuated prior to any one of the sensed conditions requiring that the system be shut down.

It is an object of this invention to provide prior warning of an impending shutdown due to one or more preselected operating conditions.

It is a further object of this invention to indicate after a shutdown which operating condition, or combination thereof, caused the shutdown.

It is another object of this invention to enable operating personnel to take corrective action that may prevent equipment shutdown and/or damage.

It is a further object of this invention to expedite troubleshooting after a shutdown. These objects, and others as will become apparent hereinafter, are accomplished by the present invention.

Basically, safety switches are replaced by dual range switches which actuate an indicating or warning circuit at a first sensed level and shut down the system at a second sensed level of an operating condition. Upon actuation of the indicating or warning circuit, the indicator remains actuated until manually disabled. A timing relay prevents false warning signals during start up.

BRIEF DESCRIPTION OF THE DRAWING

For a fuller understanding of the present invention, reference should now be made to the following detailed description thereof taken in conjunction with the accompanying drawing wherein:

The FIGURE is a ladder diagram of the electrical circuit.

DESCRIPTION OF THE PREFERRED EMBODIMENT

In the FIGURE, the terminals T1-3 of motor 10 are supplied three-phase power from a source thereof via lines L1-3. Lines L1-3 each contain a normally open contactors, M1-3 respectively, of the main contactor and lines L1 and L3 respectively contain heaters OL1 and OL3 for the thermally actuated overload relay. Lines L1 and L2 also connect across the primary winding terminals H1 and H2 of the control circuit transformer T and can supply current thereto independent of the condition of motor 10. The secondary winding terminals X1 and X2 supply power to a plurality of parallel electrical paths through fuses F. In a first electrical path 18, the components serially include: normally closed (N.C.), spring loaded, manual push button switch S1 which is used to manually stop/reset motor 10; normally open (N.O.), spring loaded manual switch S2 which is in parallel with N.O. contacts of switch UV-1 of the under voltage relay and is used to start the motor 10; N.C. switch contacts OL of the overload relay; coil UV of the under voltage relay; pressure acutated, N.O., shutdown causing contacts of the oil pressure switch OPS2 which is parallel with N.C. timing relay contacts TR1 which have a timed opening (T.O.); pressure actuated, N.C. contacts of high pressure refrigerant switch HPS2; thermostatically actuated, N.C. contacts of the low temperature (chilled water) switch LTS2; and pressure actuated, N.O. contacts of water failure (condenser) switch WFS2. A number of paired parallel paths, each made up of a pair of parallel circuits in series, are in series with N.C., manually actuated switch S3 which is used to cancel the indicators/alarms. Path 30 serially includes: N.O. timing relay switch contact TR2 with timed closing (T.C.); pressure actuated, N.C. contacts of oil pressure switch OPS1; and, oil pressure relay coil OPR. The associated path 31 serially includes N.O. oil pressure relay switch contacts OPRS and indicator light 20 for indicating the occurrence of low oil pressure. Path 31 is connected with the path 30 by line 32. Path 34 serially includes, N.O., thermostatically responsive low temperature switch contacts LTS1 and low temperature relay coil LTR. Path 35 serially includes N.O. contacts of low temperature relay switch LTRS and indicator light 22 for indicating low temperature. Path 35 is connected to path 34 by line 36. Path 38 serially includes, N.O., pressure responsive high pressure switch HPS1 and high pressure relay coil HPR. Path 39 serially includes N.O. contacts of high pressure relay switch HPRS and indicator light 24 for indicating high pressure. Path 39 is connected to path 38 by line 40.

Path 42 serially includes, N.C., pressure responsive water failure switch WFS1 and water failure relay coil WFR. Path 43 serially includes N.O. contacts of water failure relay switch WFRS and indicator light 26 for indicating condenser water failure. Path 43 is connected to path 42 by line 44. Path 46 serially includes N.O. contacts of low pressure relay switch LPRS and low pressure relay coil LPR. Path 47 serially includes, N.C., pressure responsive, low pressure refrigerant switch LPS1A, N.O. contacts of operating thermostat switch OTR-1, N.O. contacts of under voltage relay switch UV-3, N.O. contacts of main contactor switch M4 and indicator light 28 for indicating low refrigerant pressure. Path 47 is connected to path 46 by line 48. Path 50 serially includes N.O. contacts of main contactor switch M5, N.O. contacts of low pressure switch LPS2 and timing relay coil TR. Path 49 contains N.O. pressure responsive low pressure refrigerant switch LPS1B which is coupled to switch LPS1A. Path 49 provides a bypass for main contactor switch M5. Path 51 serially includes manual push button switch LPS2A which provides a bypass for low pressure refrigerant switch LPS2, main contactor coil M and instantaneous closing (I.C.) contacts of timing relay switch TR3. Path 51 is connected to path 50 by line 52. Path 54 serially includes N.O. contacts of operating thermostat relay OTR-2 and the coil SV of the N.C. refrigerant solenoid valve. Path 56 serially includes main switch M6 and the elapsed time meter ETM which records the length of time the motor 10 has been running. Path 58 serially includes N.C., thermostatically responsive operating thermostat (chilled water) switch OT and operating thermostat relay coil OTR.

A second, commonly actuated but electrically isolated electrical circuit contains switches actuated by the various relays and provides a summary fault alarm signal. The summary fault alarm signal may, for example, provide a signal via lines AS1 and AS2 to the remote control room of a ship in addition to the signals supplied at the equipment via lights 20, 22, 24, 26 and 28. Specifically, the oil pressure relay coil OPR controls the N.O. contacts of switch OPRS-2, the low temperature relay coil LTR controls the N.O. contacts of switch LTRS-2, the low pressure relay coil LPR controls the N.O. contacts of switch LPRS-2, the high pressure relay coil HPR controls the N.O. contacts of switch HPRS-2 and the water failure relay coil WFR controls the N.O. contacts of switch WFRS-2. Therefore, a summary alarm will be activated in a second location whenever any one of the indicator lights 20, 22, 24, 26 or 28 is actuated/lit.

In the foregoing description, the designation of a switch as normally open (N.O.) or normally closed (N.C.) is based upon its uninstalled or on-the-shelf condition. As a result, some of the switches will be actuated prior to startup. Because a warning is given via indicator lights 20, 22, 24, 26 and 28 as well as to a second location, in summary fashion, via lines AS1 and AS2 prior to shutting down the system, dual pressure or thermostatic switches are used to make the separate contact closures for actuating the indicator lights and shutting down the system. Suitable pressure and temperature actuated control switches are the Detroit 400-Controls which are manufactured by Detroit Switch, Inc. and are available in one, two, three and four switch models.

Operation

Assuming a shipboard system, at start up, normal sea water and chilled water are available. The sea water is used to cool the condenser tubes and the chilled water is the cooling water from the evaporator portion of the chiller and is sometimes referred to as secondary refrigerant. The presence of circulating sea water causes N.O. water failure switch WFS2 to close thereby opening N.C. water failure switch WFS1 since these switches are actually different parts of the same double throw switch. Power is supplied via lines L1 and L2 to terminals H1 and H2 of transformer T, but there is no complete circuit connecting the terminals X1 and X2 of the transformer T through any of the electrical paths. The operator then manually closes start switch S2 which completes a circuit through line 18 serially including switch S1, switch S2, overload relay switch OL, under voltage relay coil UV, timing relay switch TR1, switch HPS2, switch LTS2 and switch WFS2. The completion of this circuit through line 18 actuates the under voltage relay coil UV causing the closing of contacts of switches UV-1, UV-2 and UV-3. The closing of contacts of switch UV-1 bypasses switch S2 which permits the under voltage relay to maintain itself when switch S2 is released. The closing of the contacts of switch UV-2 completes a circuit through path 58 powering the operating thermostat relay coil OTR of the operating thermostat relay which causes the closing of the contacts of operating thermostat switches OTR-1 and OTR-2 in paths 47 and 54, respectively. The closing of the contacts of switch OTR-2 powers the solenoid valve coil SV which causes the N.C. solenoid valve (not illustrated) to open and permit refrigerant flow. The presence of refrigerant pressure due to opening of SV causes switch LPS1A to open, switch LPS1B to close and switch LPS2 to close. Additionally, the closing of the contacts of switch UV-2 permits the picking up of the timing relay since a complete circuit is established through lines 49 and 50 serially including switch UV-2, switch LPS1B, switch LPS2 and timing relay coil TR which actuates the timing relay. The actuation of the timing relay causes the instantaneous closing of contacts of switch TR3 which places the main contactor coil M in a completed circuit serially including switch UV-2, switch LPS1B, switch LPS2, main contactor coil M and switch TR3. This actuates the main contactor coil M and causes the closing of contacts of switches M1-M6 which causes the motor 10 to run. The actuation of the timing relay also causes the contacts of switch TR1 to open after an elapsed time and causes the contacts of switch TR2 to close after an elapsed time. When contacts TR1 open after an elapsed time, the under voltage relay coil UV and thereby the under voltage relay will be disabled and motor 10 stopped unless the compressor has developed sufficient oil pressure to cause switch OPS2 to close and thereby form a parallel path around switch TR1 prior to the timed opening of switch TR1. Similarly, the closing of the contacts of the switch TR2 after an elapsed time permits the oil pressure to build up and cause switch OPS1 to open prior to the closing of switch TR2 otherwise a circuit will be established serially including switch TR2 and switch OPS1 as well as establishing parallel paths through indicator light 20 and oil pressure relay coil OPR before combining prior to switch S3. The placing of oil pressure relay coil OPR in the circuit would activate the oil pressure relay causing switches OPRS AND OPRS-2 to be closed thereby activating light 20 and providing a summary signal via lines AS1 and AS2 until switch S3 is manually opened. Such a circuit, if established at start up, would yield a false alarm. Switch OPS2 will also open to stop the motor 10 if the oil pressure is sufficiently low or drops sufficiently.

During operation, the opening of the contacts of overload relay switch OL, switches OPS2, HPS2, LTS2 or WFS2 will cause the disabling of the under voltage relay coil UV thereby opening switches UV-1, UV-2 and UV-3 and thereby stopping motor 10 through the disabling of main contactor coil M and the resultant opening of switches M1-3. When normal conditions are re-established, start switch S2 must again be pressed to start motor 10 as described above. The contacts of low pressure switch LPS2 will open if the refrigerant pressure is sufficiently low and main contactor coil M will be disabled. Disabling the main contactor stops the motor 10, but since the contacts of overload relay switch OL and switch OPS2, HPS2, LTS2 and WFS2 remain closed, relay coil UV remains energized so that upon a pressure increase causing switches LPS1B and LPS2 to close, motor 10 will restart without pushing the start button, switch S2.

If a low voltage condition or voltage failure arises, under voltage coil UV becomes disabled thereby opening switches UV-1, UV-2 and UV-3 which causes the stopping of motor 10. Upon restoration of normal voltage, it will be necessary to push start button, switch S2 in order to start motor 10 as set forth above. This provides low voltage protection to the system. In case of an overload, heaters OL1 and/or OL3 will cause the opening of thermally actuated overload relay switch OL. The opening of switch OL disables the under voltage relay coil UV and thereby causes motor 10 to stop as described above. To restart motor 10, when the overload is cleared, the stop-reset button S1 must be pushed, which resets the overload relay, and then start button, switch S2 is pressed to start the motor 10 as previously described. The motor 10 is manually disabled by pressing and opening stop-reset switch S1. Low pressure switch LPS2 can be bypassed by means of switch LPS2A which maintains motor operation even if switch LPS2 is open. Switch LPS2A must be held to maintain the bypass and is used during refrigeration system servicing.

The closing of switches OPS1, LTS1, HPS1, WFS1 and LPS1A each provides a prior warning of an impending shutdown of associated switches OPS2, LTS2, HPS2, WFS2 and LPS2, respectively. Closure of switches OPS1, LTS1, HPS1, WFS1 and LPS1A rspectively activate coils OPR, LTR, HPR, WFR and LPR and indicator lights 20, 22, 24, 26 and 28. When, for example, relay coil OPR is activated, switches OPRS and OPRS-2 are closed. The closing of switch OPRS allows coil OPR to be maintained and indicator light 20 lit even if switch OPS1 reopens. The closing of switch OPRS-2 completes a circuit between lines AS1 and AS2 to provide a summary fault alarm signal. The actuation of relay coils LTR, HPR, WFR and LPR results in corresponding action. Because the closing of switches OPS1, LTS1, HPS1, WFS1 and LPS1A result in a warning and summary signal without shutting down the system, one or more of indicator lights 20, 22, 24, 26 and 28 can be lit at the same time. After one or more of switches OPS1, LTS1, HPS1, WFS1 and LPS1A have closed it is necessary to manually open switch S3 to shut off the indicator light(s) and summary alarm.

When the temperature of the chilled water reaches a predetermined lower value, thermostatically responsive switch OT opens thereby disabling operating thermostat relay coil OTR. The disabling of coil OTR causes the opening of switches OTR-1 and OTR-2. The opening of switch OTR-1 prevents a false alarm signal due to the eventual closing of LPS1A after refrigerant flow is shut off. The opening of switch OTR-2 interrupts the circuit through line 54 disabling the coil SV of the solenoid valve to shut off the flow of refrigerant.

From the foregoing it is clear that a first level abnormal operating condition results in the activation of a specific indicator as well as giving a summary fault signal. The activation of the indicator persists because a relay is closed when the indicator is initially activated and an electrical path is established independent of the initial indication. Upon the reaching of a second level abnormal operating condition the system is shut down with the indicator activation persisting. Because of the respective timed opening and closing of relay switches TR1 and TR2, respectively, false alarms are avoided at start up. Similarly, switch OTR-1 is opened to avoid a false alarm when the solenoid valve is closed because the lower temperature value of chilled water is reached. The presence of switch UV-3 in line 47 prevents the bypassing of switch UV-2 should all other switches in lines 46 and 47 be closed while prior warning of impending low refrigerant pressure is displayed. The presence of switch M4 in line 47 prevents a false low refrigerant pressure alarm just prior to startup of motor 10.

Although a preferred embodiment of the present invention has been illustrated and described, other changes will occur to those skilled in the art. It is therefore intended that the scope of the present invention is to be limited only by the scope of the appended claims.

What is claimed is:

1. In a system driven by a motor, apparatus for providing a persistent indication of an impending shutdown when any of a plurality of preselected conditions reach a first level and for shutting off said motor when any one of said preselected conditions reaches a second level comprising:

circuit means for shutting off said motor when any one of said preselected conditions reaches said second level;

a plurality of electrical paths in parallel with said circuit means with each of said plurality of electrical paths being made up of a first and second parallel circuit in series;

each of said first parallel circuits having a first branch containing a first open switch means closable in response to one of said preselected conditions reaching its said first level and a second branch containing a normally open relay operated second switch means;

each of said second parallel circuits having a first branch containing a relay coil means for controlling the second switch means in the corresponding first parallel circuit and a second branch containing indicator means whereby upon any one of said preselected conditions reaching its said first level, the corresponding first switch means closes thereby activating the corresponding relay coil means which in turn closes the corresponding second switch means and activates said indicator means.

2. In a system driven by a motor, apparatus for providing a persistent indication of an impending shutdown when any of a plurality of preselected conditions reach a first level and for shutting off said motor when any one of said preselected conditions reaches a second level comprising:

circuit means for shutting off said motor when any one of said preselected conditions reaches said second level;

first and second electrical paths in parallel with said circuit means and each including a first and second parallel circuit in series and with said first parallel circuit of each of said first and second electrical paths being in parallel with each other;

said first parallel circuit of said first electrical path having a first branch serially containing an open first switch means closable in response to one of said preselected conditions reaching its first level and an open first relay switch means and a second branch containing an open second relay switch means;

said second parallel circuit of said first electrical path having a first branch containing first relay coil means for closing said second relay switch means and a second branch containing indicator means;

said first parallel circuit of said second electrical path having a first branch containing a closed second switch means commonly actuated with said first switch means and operable in response to said one of said preselected conditions reaching its first level and a second branch containing an open third relay switch means;

closed third switch means serially connecting said first and second parallel circuits of said second electrical path and operable in response to said one of said preselected conditions reaching its second level; and said second parallel circuit of said second electrical path having a first branch serially containing main contactor relay coil means for closing said first and third relay switch means and for providing power to said motor and open fourth relay switch means and a second branch containing timing relay coil means for closing said fourth relay switch means whereby said indicator means is prevented from giving a false alarm at start up but is activated when said one condition reaches a first level by the closing of said first switch means.

3. The apparatus of claim 2 further including:

a third electrical path in parallel with said circuit means including first and second parallel circuits in series;

said first parallel circuit of said third electrical path having a first branch serially containing open fifth relay switch means closed by said timing relay with a timed closing and open fourth switch means closable in response to a second one of said preselected conditions reaching its first level and a second branch containing open fifth relay switch means; and said second parallel circuit of said third electrical path having a first branch containing second relay coil means for closing said fifth relay switch means and a second branch containing second indicator means whereby said fourth switch means can only activate said second relay coil means and said second indicator means after the timed closing of said fifth relay switch means which prevents a false alarm due to said second one of said preselected conditions at start up.

* * * * *